United States Patent
Tazaki et al.

(10) Patent No.: US 10,587,205 B2
(45) Date of Patent: *Mar. 10, 2020

(54) SWITCHING POWER SUPPLY DEVICE INCLUDING AN INRUSH CURRENT PREVENTION CIRCUIT

(71) Applicant: Panasonic Intellectual Property Management Co., Ltd., Osaka (JP)

(72) Inventors: Shintaro Tazaki, Kanagawa (JP); Shinta Kato, Kanagawa (JP); Shigenori Arai, Kanagawa (JP); Ryo Ichiki, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/351,266

(22) Filed: Mar. 12, 2019

(65) Prior Publication Data

US 2019/0214920 A1 Jul. 11, 2019

Related U.S. Application Data

(63) Continuation of application No. 16/072,138, filed as application No. PCT/JP2017/003278 on Jan. 31, 2017, now Pat. No. 10,270,360.

(30) Foreign Application Priority Data

Mar. 16, 2016 (JP) .................................. 2016-052201

(51) Int. Cl.
*H02M 7/06* (2006.01)
*H02M 7/12* (2006.01)
(Continued)

(52) U.S. Cl.
CPC .............. *H02M 7/062* (2013.01); *B60L 53/22* (2019.02); *H02M 1/32* (2013.01); *H02M 7/06* (2013.01); *H02M 7/12* (2013.01); *H02M 7/1557* (2013.01)

(58) Field of Classification Search
None
See application file for complete search history.

(56) References Cited

U.S. PATENT DOCUMENTS

| 6,603,675 B1 | 8/2003 | Norrga | |
| 2010/0246217 A1* | 9/2010 | Sakakibara | H02M 1/32 363/37 |

(Continued)

FOREIGN PATENT DOCUMENTS

JP    2012-010507 A    1/2012

OTHER PUBLICATIONS

International Search Report of PCT application No. PCT/JP2017/003278 dated Mar. 21, 2017.

(Continued)

*Primary Examiner* — Jeffrey A Gblende
(74) *Attorney, Agent, or Firm* — Seed IP Law Group LLP (57) ABSTRACT

A switching power supply device includes: a plurality of power supply circuits which include a first power supply circuit and a second power supply circuit and respectively correspond to a plurality of phases of a multiphase AC power supply; a switching circuit; an inrush current prevention (ICP) circuit; and a control circuit. The control circuit causes the switching circuit to switch a phase to be connected to the second power supply circuit to a phase corresponding to the first power supply circuit, and causes the ICP circuit to function so that initial charge of electrolyte capacitors included in the respective power supply circuits is performed. After the initial charge is completed, the control (Continued)

circuit causes the switching circuit to switch the phase to be connected to the second power supply circuit to the phase corresponding to the second power supply circuit, and causes the ICP circuit to turn off.

8 Claims, 11 Drawing Sheets

(51) Int. Cl.
*B60L 53/22* (2019.01)
*H02M 1/32* (2007.01)
*H02M 7/155* (2006.01)

(56) References Cited

U.S. PATENT DOCUMENTS

| | | | |
|---|---|---|---|
| 2011/0007531 A1* | 1/2011 | Sakakibara | H02M 5/4585 363/37 |
| 2011/0227418 A1 | 9/2011 | Pyboyina et al. | |
| 2014/0176100 A1 | 6/2014 | Hara et al. | |
| 2015/0022003 A1* | 1/2015 | Dighrasker | H02M 5/42 307/65 |
| 2017/0133922 A1 | 5/2017 | Venkataramanan et al. | |

OTHER PUBLICATIONS

English Translation of Chinese Search Report dated Oct. 24, 2019 for the related Chinese Patent Application No. 201780015717.5.
English Translation of the First Office Action dated Oct. 24, 2019 for the related Chinese Patent Application No. 201780015717.5.

* cited by examiner

SWITCHING POWER SUPPLY DEVICE INCLUDING AN INRUSH CURRENT PREVENTION CIRCUIT

This application is a continuation of U.S. application Ser. No. 16/072,138, which is a U.S. national stage application of the PCT International Application No. PCT/JP2017/003278 filed on Jan. 31, 2017, which claims the benefit of foreign priority of Japanese patent application No. 2016-052201 filed on Mar. 16, 2016, the contents all of which are incorporated herein by reference.

TECHNICAL FIELD

The present disclosure relates to a switching power supply device.

BACKGROUND ART

Conventionally, a power supply device is known which converts alternating-current (AC) power from a multiphase AC power supply into direct-current (DC) power (for example, see Patent Literature 1).

CITATION LIST

Patent Literature

PTL 1: Japanese Patent Unexamined Publication No. 2012-10507

SUMMARY OF THE INVENTION

The present disclosure provides a switching power supply device which is capable of reducing the cost and the size of the device.

A switching power supply device according to one embodiment of the present disclosure includes a plurality of power supply circuits, a switching circuit, an inrush current prevention circuit, and a control circuit. The plurality of power supply circuits include a first power supply circuit and a second power supply circuit, and respectively correspond to a plurality of phases of a multiphase AC power supply. The switching circuit switches a phase to be connected to the second power supply circuit between a phase corresponding to the first power supply circuit and a phase corresponding to the second power supply circuit. The inrush current prevention circuit is disposed on a negative power line of the multiphase AC power supply, at a position closer to the multiphase AC power supply than a connection point is. The plurality of power supply circuits are connected with each other at the point. The inrush current prevention circuit prevents inrush current. The control circuit controls the switching circuit and the inrush current prevention circuit. The control circuit causes the switching circuit to switch the phase to be connected to the second power supply circuit to the phase corresponding to the first power supply circuit, and causes the inrush current prevention circuit to function so that initial charge of capacitors respectively included in the plurality of power supply circuits is performed. Moreover, when the initial charge of the capacitors is completed, the control circuit causes the switching circuit to switch the phase to be connected to the second power supply circuit to the phase corresponding to the second power supply circuit, and causes the inrush current prevention circuit to turn off.

According to the present disclosure, it is possible to provide a switching power supply device capable of reducing the cost and the size of the device.

DESCRIPTION OF EMBODIMENTS

Prior to the description of embodiments of the present disclosure, problems in a conventional technology will be briefly described. In a case where an inrush current prevention circuit for protecting the circuit from inrush current is disposed for each phase in a power supply device which can receive AC power from a multiphase AC power supply, the cost and size of the power supply device are increased.

Hereinafter, respective embodiments of the present disclosure will be described in detail with reference to the drawings.

First Exemplary Embodiment

Figure 1:
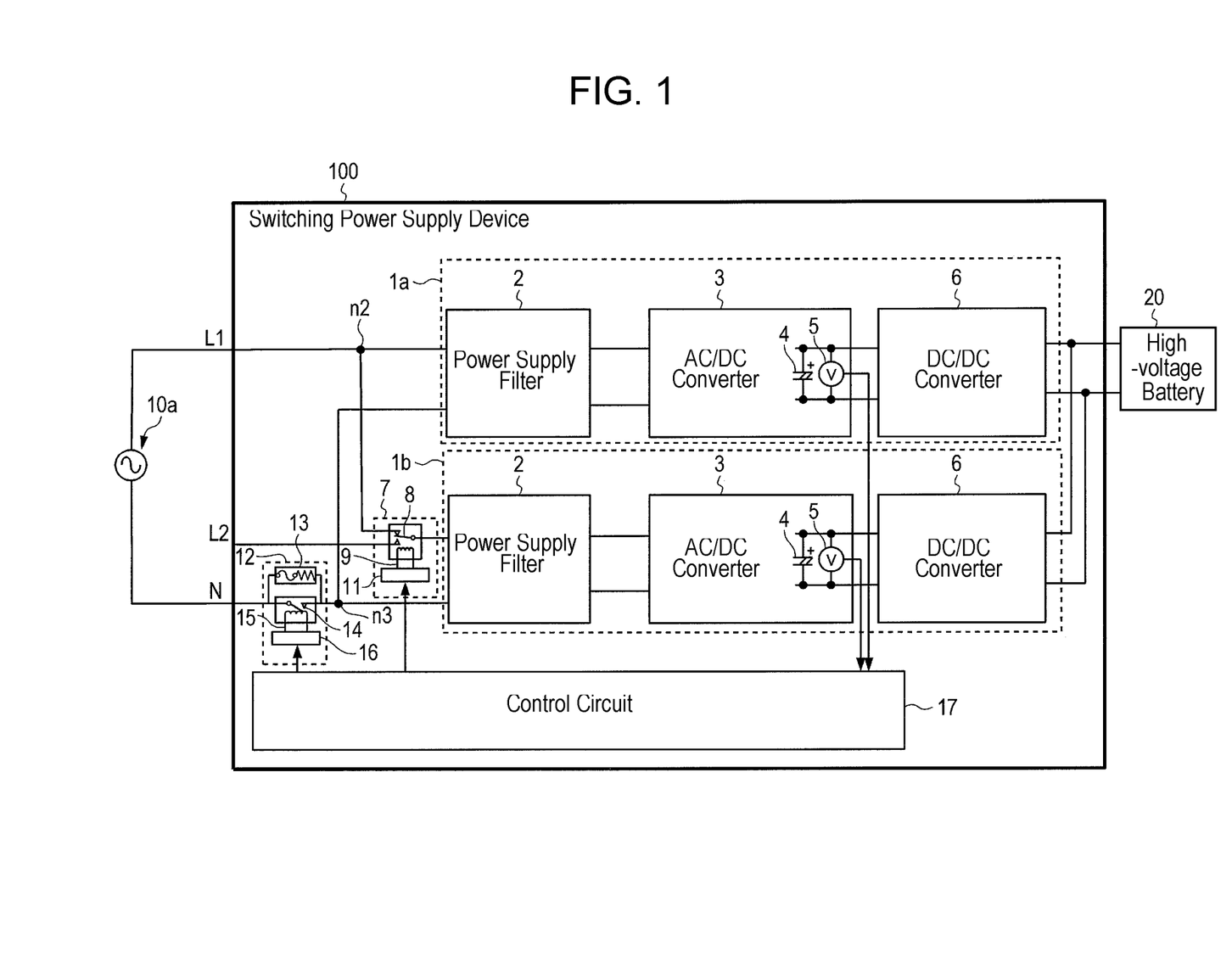
FIG. 1 is a circuit diagram illustrating a case where a switching power supply device according to a first exemplary embodiment of the present disclosure is connected to a single-phase AC power supply.

First, an example of a configuration of switching power supply device 100 according to the present embodiment will be described with reference to FIG. 1. FIG. 1 is a circuit diagram illustrating a configuration example of switching power supply device 100. Switching power supply device 100 may be used in, for example, a charging device for vehicles (for example, electric vehicles or hybrid vehicles), or in another device.

Switching power supply device 100 converts AC power from an AC power supply into DC power, and outputs the DC power to high-voltage battery 20. In FIG. 1, single-phase AC power supply 10a is illustrated as an example; however, two-phase AC power supply 10b may be applied (see FIG. 3 and FIG. 4). High-voltage battery 20 is, for example, a battery for driving the motor of a vehicle. An example of high-voltage battery 20 is a lithium ion battery.

Switching power supply device 100 includes power supply circuit 1a, power supply circuit 1b, switching circuit 7, inrush current prevention circuit 12, and control circuit 17. Switching power supply device 100 includes two power supply circuits 1a and 1b in order to correspond to the two-phase AC power supply.

Each of power supply circuits 1a and 1b includes power supply filter 2, AC/DC converter 3, and DC/DC converter 6.

Power supply filter 2 receives AC power from single-phase AC power supply 10a or two-phase AC power supply 10b. Power supply filter 2 prevents noise from entering the power supply line and flowing out of the power supply line.

AC/DC converter 3 is disposed in a subsequent stage of power supply filter 2. AC/DC converter 3 converts the AC power from power supply filter 2 into DC power, and outputs the DC power to DC/DC converter 6.

Moreover, AC/DC converter 3 includes: electrolytic capacitor 4 on which initial charge (pre-charge) is performed; and voltmeter 5 which measures the voltage of electrolytic capacitor 4. The voltage value measured by voltmeter 5 is output to control circuit 17.

DC/DC converter 6 is disposed in a subsequent stage of AC/DC converter 3. DC/DC converter 6 transforms the DC voltage from AC/DC converter 3 to different DC voltage, and outputs the transformed DC voltage to high-voltage battery 20.

Switching circuit 7 switches between a first mode in which only power supply circuit 1a is driven when the AC power supply is single-phase AC power supply 10a and a second mode in which power supply circuit 1a and power supply circuit 1b are driven when the AC power supply is two-phase AC power supply 10b. In other words, switching circuit 7 is capable of switching the phase to be connected to the power supply circuit (for example, 1b) which does not correspond to a given phase (for example, L1) of the multiphase AC power supply (for example, 10b), among a plurality of power supply circuits 1a and 1b, between the given phase of the multiphase AC power supply and the phase (for example, L2) corresponding to the power supply circuit.

Switching circuit 7 includes switching relay 8, coil 9, and drive circuit 11. Drive circuit 11 switches between on and off of switching relay 8 in response to a control signal from control circuit 17. This control signal indicates turning on switching relay 8 or turning off switching relay 8.

Figure 4:
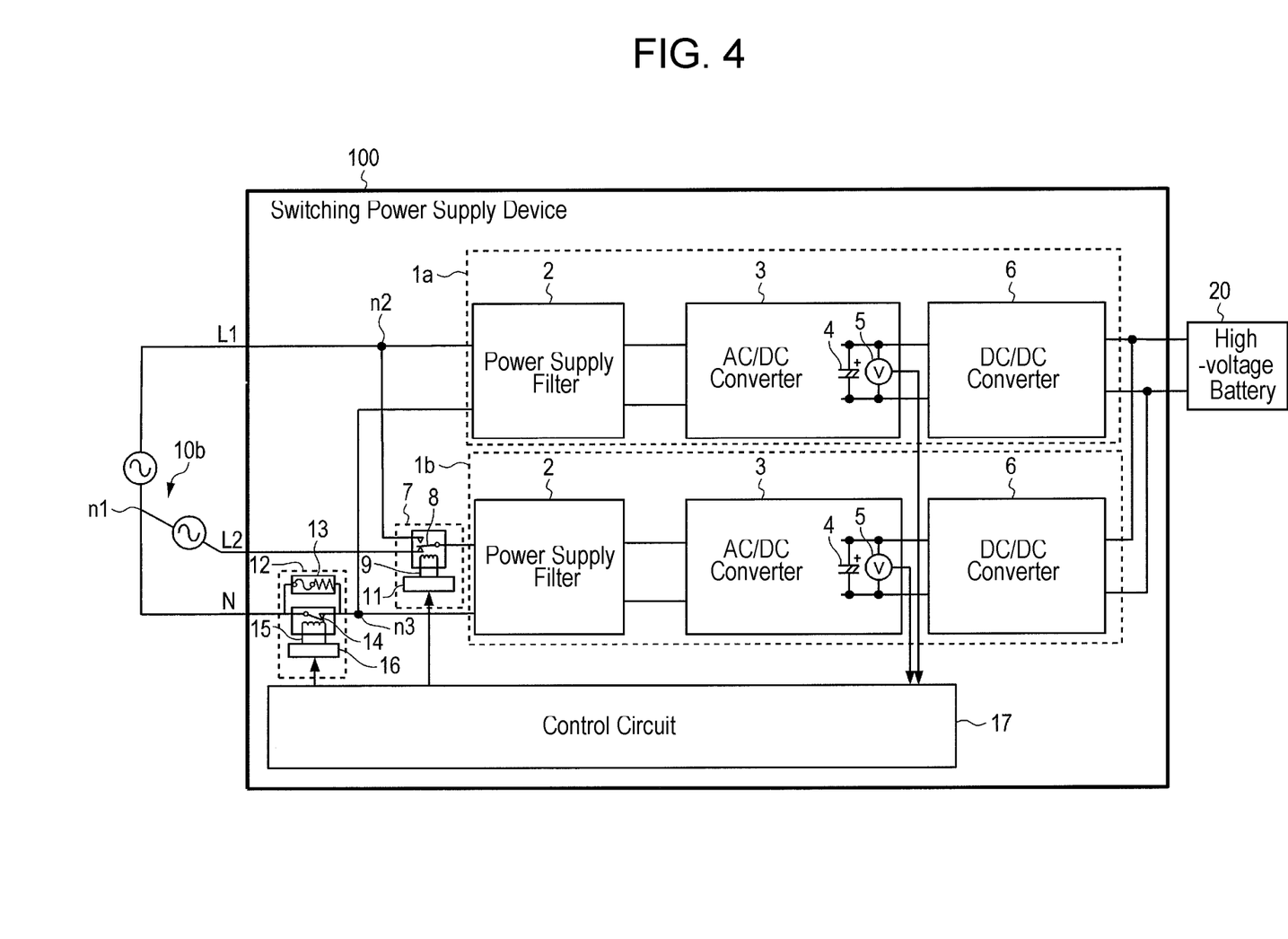
FIG. 4 is a circuit diagram illustrating a case where the switching power supply device according to the first exemplary embodiment of the present disclosure is connected to the two-phase AC power supply.

The off-state of switching relay 8 refers to the state, as illustrated in FIG. 1, where switching relay 8 is connected to one of power supply lines L1 branched at branch point n2. In contrast, the on-state of switching relay 8 refers to the state, as illustrated in FIG. 4, where switching relay 8 is connected to power supply line L2. Note that branch point n2 is a point (position) on the positive power supply line L1 (first phase).

Inrush current prevention circuit 12 is disposed at a position closer to single-phase AC power supply 10a than meeting point (connection point) n3 is. The negative line of power supply circuit 1a and the negative line of power supply circuit 1b are connected with each other at meeting point n3. Inrush current prevention circuit 12 limits inrush current. Meeting point n3 is a point (position) on negative power supply line N.

Inrush current prevention circuit 12 includes: inrush current limiting circuit 13 including a fuse and an inrush current limiting resistor; inrush prevention relay 14; coil 15; and drive circuit 16. Drive circuit 16 switches between on and off of inrush prevention relay 14 in response to a control signal from control circuit 17. This control signal indicates turning on inrush prevention relay 14 or turning off inrush prevention relay 14. Note that FIG. 1 illustrates, as an example, a case where inrush prevention relay 14 is off. FIG. 4 illustrates, as an example, a case where inrush prevention relay 14 is on.

Control circuit 17 is configured of, for example, a central processing unit (CPU), a read only memory (ROM), and a random-access memory (RAM).

For example, control circuit 17 causes switching circuit 7 to switch the phase to be connected to the power supply circuit (for example, 1b) which does not correspond to a given phase (for example, L1) to the given phase, and causes inrush current prevention circuit 12 to function (turns off inrush prevention relay 14) so that initial charge of electrolyte capacitors 4 included respectively in the power supply circuits (for example, 1a, 1b) is performed. When the initial charge of electrolyte capacitors 4 is completed, control circuit 17 causes switching circuit 7 to switch the phase to be connected to the power supply circuit which does not correspond to the given phase to the phase (for example, L2) corresponding to the power supply circuit, and turns off inrush current prevention circuit 12 (turns on inrush prevention relay 14). Note that the details of the control performed by control circuit 17 will be described later with reference to FIG. 2.

An example of the configuration of switching power supply device 100 has been described above.

Figure 2:
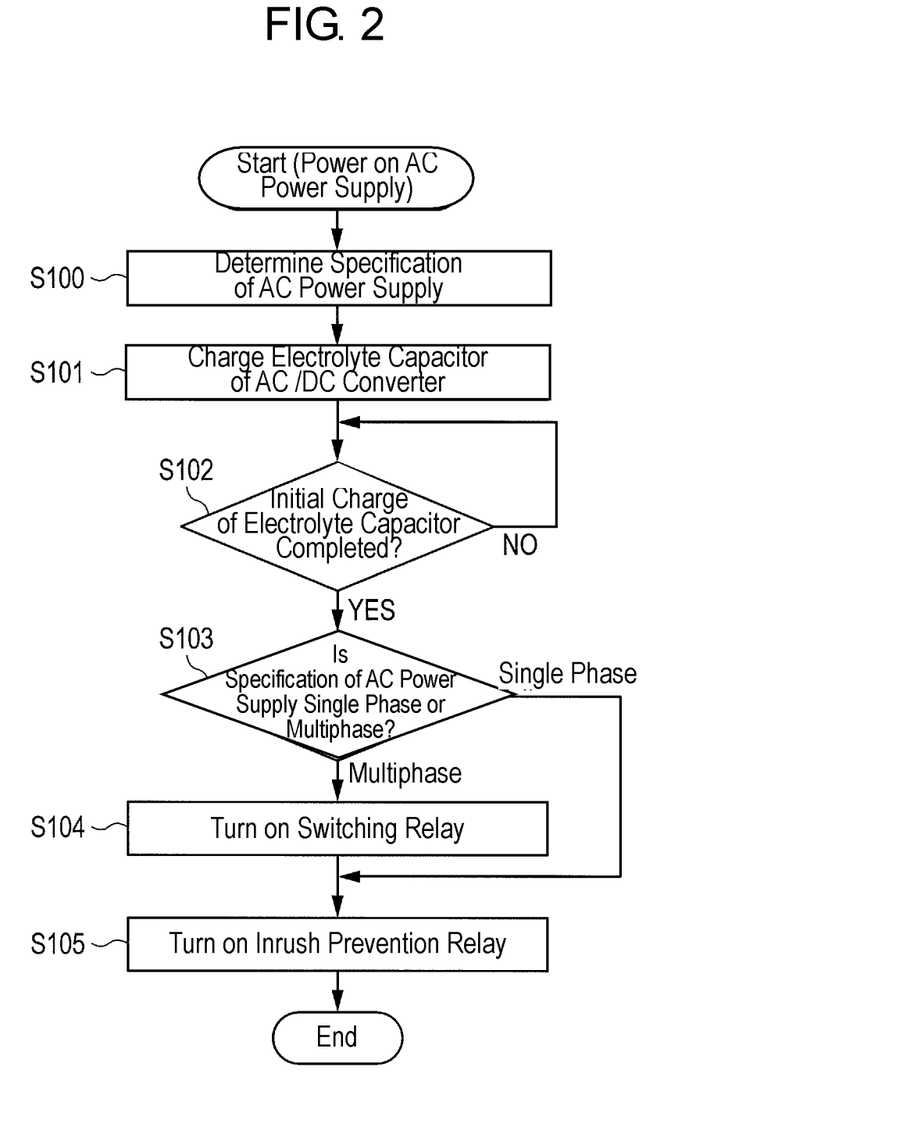
FIG. 2 is a flowchart of an operation example of the switching power supply device according to the first exemplary embodiment of the present disclosure.

Next, an example of an operation of switching power supply device 100 will be described with reference to FIG. 2. FIG. 2 is a flowchart of an operation example of switching power supply device 100. The operation described below starts, for example, when an AC power supply is powered on. At this time, both switching relay 8 and inrush prevention relay 14 are off.

First, control circuit 17 determines the specification of the connected AC power supply (step S100). Specifically, control circuit 17 determines whether the AC power supply is single-phase AC power supply 10a or two-phase AC power supply 10b.

Next, control circuit 17 performs control according to the determined specification of the AC power supply such that charging (initial charge) of electrolyte capacitor 4 of AC/DC converter 3 is performed (step S101).

Specifically, when the specification of the AC power supply is single-phase AC power supply 10a, control circuit 17 performs control such that initial charge of electrolyte capacitor 4 of AC/DC converter 3 of power supply circuit 1a is performed. At this time, switching relay 8 and inrush prevention relay 14 are off as illustrated in FIG. 1.

Since inrush prevention relay 14 is off at this time, power supplied from single-phase AC power supply 10a is supplied to power supply circuit 1a via power supply line L1, and is also supplied to the inrush current limiting resistor of inrush current limiting circuit 13. This allows charging (initial charge) of electrolyte capacitor 4 of power supply circuit 1a to be performed while preventing inrush current from flowing to power supply circuit 1a.

Figure 3:
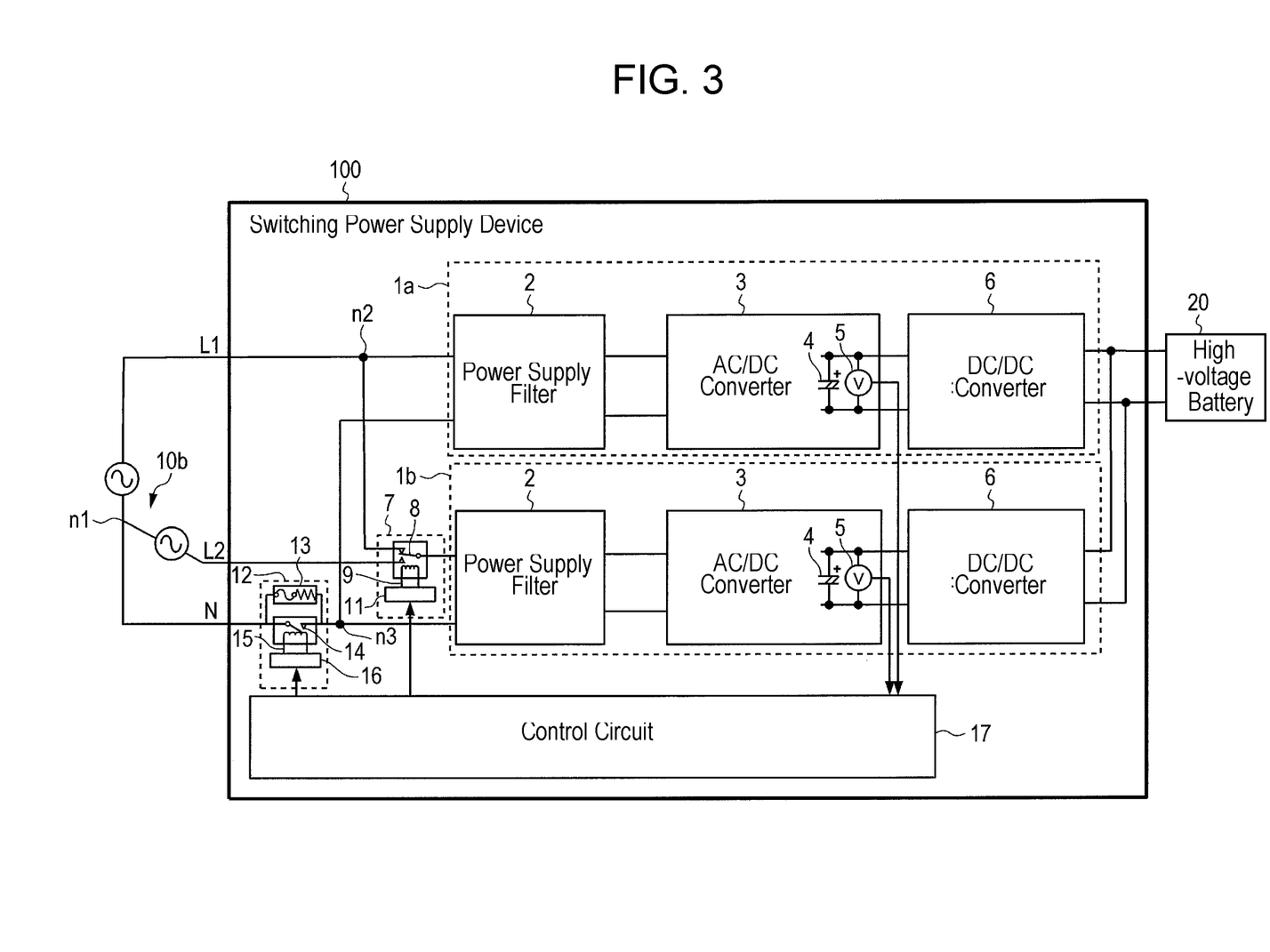
FIG. 3 is a circuit diagram illustrating a case where the switching power supply device according to the first exemplary embodiment of the present disclosure is connected to a two-phase AC power supply.

In contrast, when the specification of the AC power supply is two-phase AC power supply 10b, control circuit 17 performs control such that initial charge of electrolyte capacitor 4 of AC/DC converter 3 in each of power supply circuits 1a and 1b is performed. At this time, switching relay 8 and inrush prevention relay 14 are off as illustrated in FIG. 3. Note that n1 in FIG. 3 refers to a neutral point.

Since switching relay 8 and inrush prevention relay 14 are off at this time, power supplied from two-phase AC power supply 10b is supplied to power supply circuit 1a and power supply circuit 1b via power supply line L1, and is also supplied to the inrush current limiting resistor of inrush current limiting circuit 13. In other words, the circuit configuration is such that power supply circuit 1a, power supply circuit 1b, and inrush current limiting circuit 13 are connected between neutral point n1 and the first phase (L1) of two-phase AC power supply 10b. The inrush current limiting resistor of inrush current limiting circuit 13 allows charging (initial charge) of electrolyte capacitor 4 of each of power supply circuits 1a and 1b to be performed while preventing inrush current from flowing to power supply circuits 1a and 1b.

After the above control, control circuit 17 receives the voltage values of electrolytic capacitors 4 measured by voltmeters 5, respectively.

Next, control circuit 17 compares the voltage value received from each of voltmeters 5 with a predetermined threshold value to determine whether the initial charge of electrolytic capacitors 4 is completed (step S102).

For example, when one of more of the voltage values from voltmeters 5 have not reached the threshold value, control circuit 17 determines that the initial charge is not completed (step S102: NO). In this case, the flow returns to step S102.

In contrast, for example, when the voltage values from all of voltmeters 5 have reached the threshold value, control circuit 17 determines that the initial charge is completed (step S102: YES). In this case, the flow proceeds to step S103.

Here, when the specification of the AC power supply determined in step S100 is single-phase AC power supply 10a (step S103: single phase), control circuit 17 turns on inrush prevention relay 14 (step S105). At this time, switching relay 8 is controlled to remain off. Then, only power supply circuit 1a is driven so that high-voltage battery 20 is charged (first mode).

In contrast, when the specification of the AC power supply determined in step S100 is multiphase (for example, two-phase AC power supply 10b) (step S103: multiphase), control circuit 17 turns on switching relay 8 as illustrated in FIG. 4 (step S104). Accordingly, the circuit configuration is such that power supply circuit 1a and power supply circuit 1b correspond to respective phases. In other words, the circuit configuration is such that power supply circuit 1a is connected to neutral point n1 and the first phase (L1) of two-phase AC power supply 10b therebetween, and power supply circuit 1b is connected to neutral point n1 and the second phase (L2) of two-phase AC power supply 10b therebetween.

Then, control circuit 17 turns on inrush prevention relay 14 (step S105). Accordingly, both power supply circuits 1a and 1b are driven so that high-voltage battery 20 is charged (second mode).

An example of the operation of switching power supply device 100 has been described above.

Figure 5:
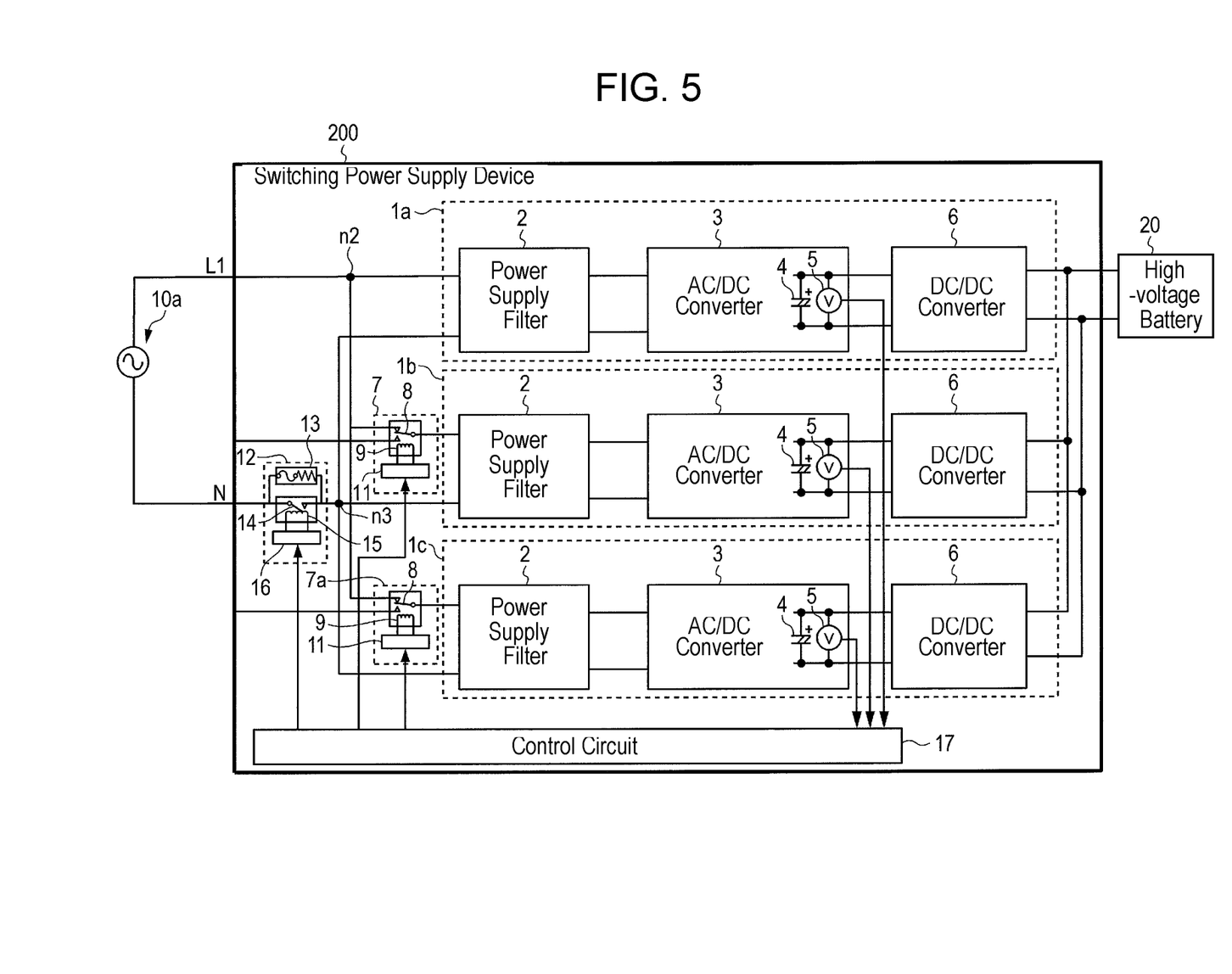
FIG. 5 is a circuit diagram illustrating a configuration example of a switching power supply device according to a comparative example described in the first exemplary embodiment of the present disclosure.

FIG. 5 illustrates a configuration example of switching power supply device 101 as an example compared to the first exemplary embodiment. Note that in FIG. 5, the structural elements which are the same as in FIG. 1, FIG. 3, and FIG. 4 are illustrated with the same reference numerals, and description of such structural elements is omitted.

As illustrated in FIG. 5, in switching power supply device 101, inrush current prevention circuits 12 are disposed both in power supply circuit 1a and power supply circuit 1b. In such a configuration, a plurality of inrush current prevention circuits 12 are required, which causes problems of increased cost and size of switching power supply device 101.

In contrast, in switching power supply device 100 according to the present embodiment, one inrush current prevention circuit 12 is disposed downstream of meeting point n3. In both of the cases where the AC power supply is single-phase AC power supply 10a and where the AC power supply is two-phase AC power supply 10b, inrush current prevention circuit 12 is used. Accordingly, it is possible to reduce the cost and size of switching power supply device 100.

Second Exemplary Embodiment

Figure 6:
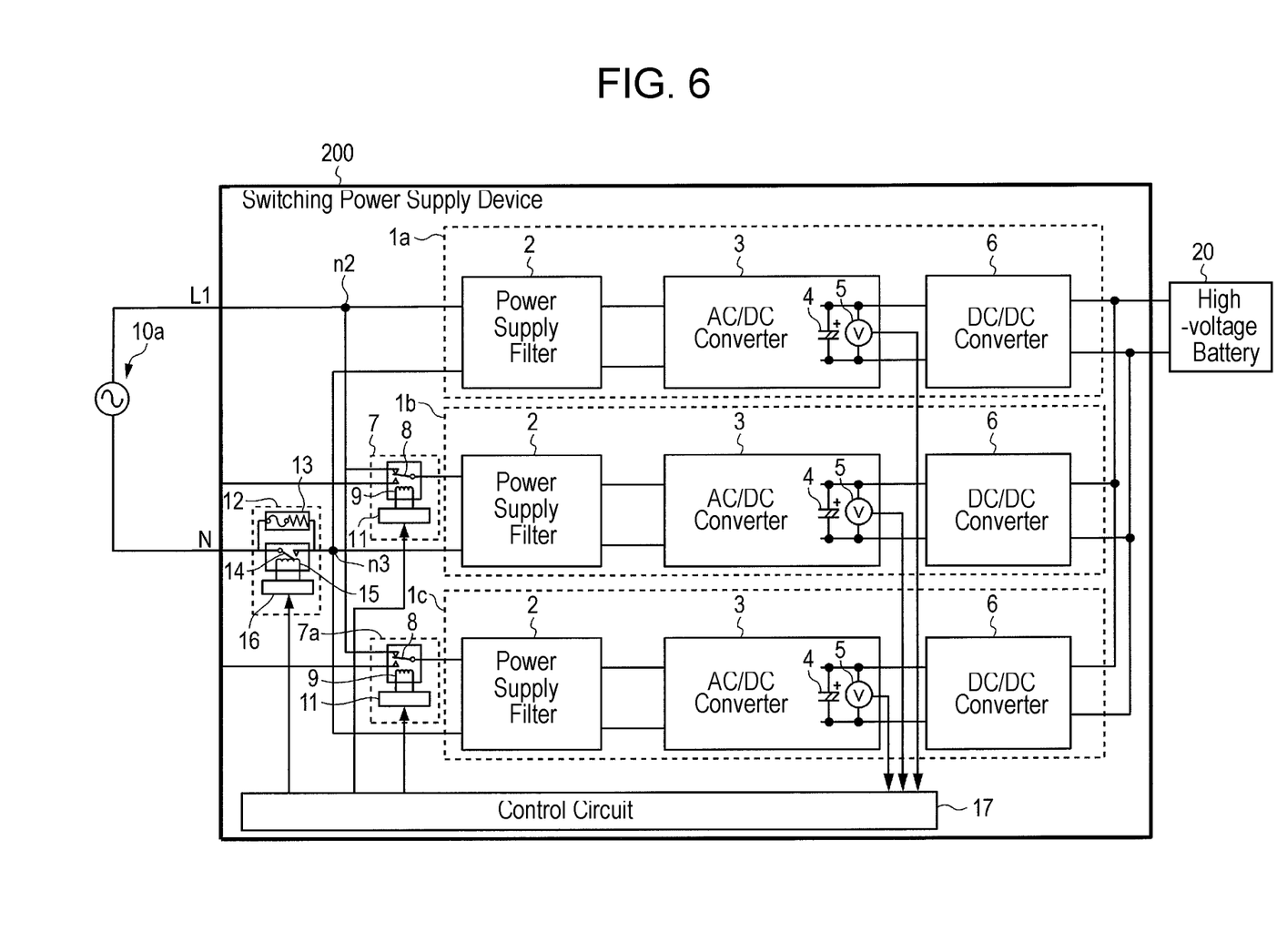
FIG. 6 is a circuit diagram illustrating a case where a switching power supply device according to a second exemplary embodiment of the present disclosure is connected to a single-phase AC power supply.

Next, an example of a configuration of switching power supply device 200 according to the present embodiment will be described with reference to FIG. 6. FIG. 6 is a circuit diagram illustrating a configuration example of switching power supply device 200. Switching power supply device 200 includes three power supply circuits (1a to 1c) to correspond to a three-phase AC power supply. Note that in FIG. 6, the structural elements which are the same as in FIG. 1 are illustrated with the same reference numerals, and description of such structural elements is omitted.

Switching power supply device 200 may be used in, for example, a charging device for vehicles (for example, electric vehicles or hybrid vehicles), or in another device.

Switching power supply device 200 is different from switching power supply device 100 illustrated in FIG. 1 in that power supply circuit 1c and switching circuit 7a are added. Power supply circuit 1c has the same configuration as those of power supply circuits 1a and 1b. Moreover, switching circuit 7a has the same configuration as that of switching circuit 7. On and off states of switching relay 8 are controlled by control circuit 17.

Figure 10:
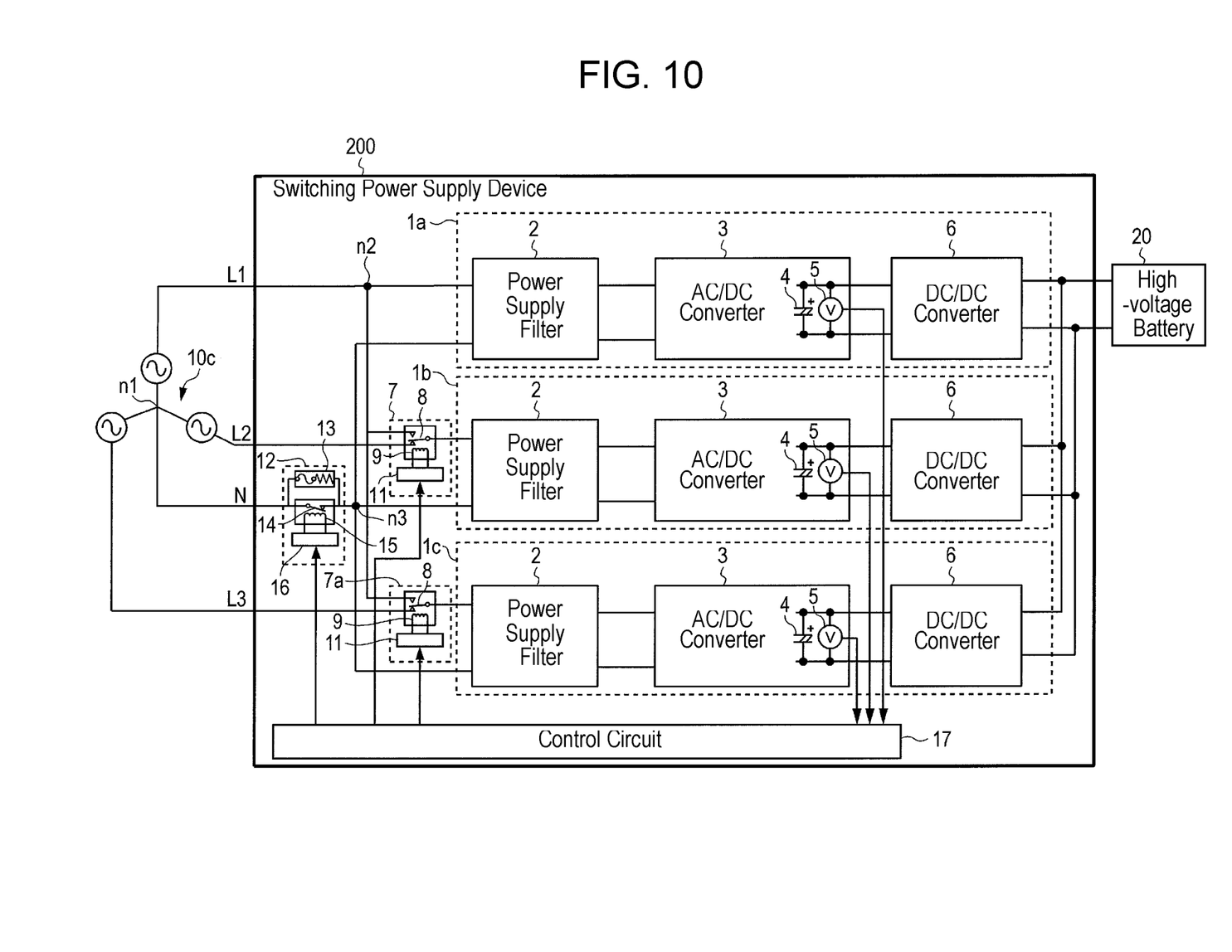
FIG. 10 is a circuit diagram illustrating a case where the switching power supply device according to the second exemplary embodiment of the present disclosure is connected to the three-phase AC power supply.

In a state where switching relay 8 of switching circuit 7a is off, switching relay 8 is connected to one of power supply lines L1 branched at branch point n2. In contrast, in a state where switching relay 8 of switching circuit 7a is on, switching relay 8 is connected to power supply line L3 as illustrated in FIG. 10.

Moreover, FIG. 6 illustrates, as an example, the case where switching power supply device 200 is connected to single-phase AC power supply 10a. However, switching power supply device 200 may be connected to two-phase AC power supply 10b (see FIG. 7 and FIG. 8) or to three-phase AC power supply 10c (see FIG. 9 and FIG. 10).

Inrush current prevention circuit 12 is disposed at a position closer to the AC power supply than meeting point (connection point) n3 is. The negative line of power supply circuit 1a, the negative line of power supply circuit 1b, and the negative line of power supply circuit 1c are connected with each other at meeting point n3. Inrush current prevention circuit 12 limits inrush current.

Note that in FIG. 6, the negative lines of power supply circuits 1a to 1c are connected at one meeting point (connection point) n3. However, for example, a first connection point at which the negative line of power supply circuit 1a is connected with the negative line of power supply circuit 1b may be different from a second connection point at which the negative line of power supply circuit 1b is connected with the negative line of power supply circuit 1c. In this case, inrush current prevention circuit 12 is disposed at a position closer to the AC power supply than the first connection point and the second connection point are.

In the present embodiment, switching circuits 7 and 7a switch between the first mode and the second mode described in the first exemplary embodiment, and the third mode where power supply circuits 1a, 1b, and 1c are driven when the AC power supply is three-phase AC power supply 10c.

An example of the configuration of switching power supply device 200 has been described above.

Next, an example of an operation of switching power supply device 200 according to the present embodiment will be described with reference to FIG. 2. The operation described below starts, for example, when the AC power supply is powered on. At this time, switching relay 8 of switching circuit 7, switching relay 8 of switching circuit 7a, and inrush prevention relay 14 are off.

First, control circuit 17 determines the specification of the connected AC power supply (step S100). Specifically, control circuit 17 determines whether the AC power supply is single-phase AC power supply 10a, two-phase AC power supply 10b, or three-phase AC power supply 10c.

Next, control circuit 17 performs control according to the determined specification of the AC power supply such that charging (initial charge) of electrolyte capacitor(s) 4 of AC/DC converter(s) 3 is performed (step S101).

Specifically, when the specification of the AC power supply is single-phase AC power supply 10a, control circuit 17 performs control such that initial charge of electrolyte capacitor 4 of AC/DC converter 3 of power supply circuit 1a is performed. At this time, switching relay 8 of switching circuit 7, switching relay 8 of switching circuit 7a, and inrush prevention relay 14 are off as illustrated in FIG. 6.

Since inrush prevention relay 14 is off at this time, power supplied from single-phase AC power supply 10a is supplied to power supply circuit 1a via power supply line L1, and is also supplied to an inrush current limiting resistor of inrush current limiting circuit 13. This allows charging (initial charge) of electrolyte capacitor 4 of power supply circuit 1a to be performed while preventing inrush current from flowing to power supply circuit 1a.

Figure 7:
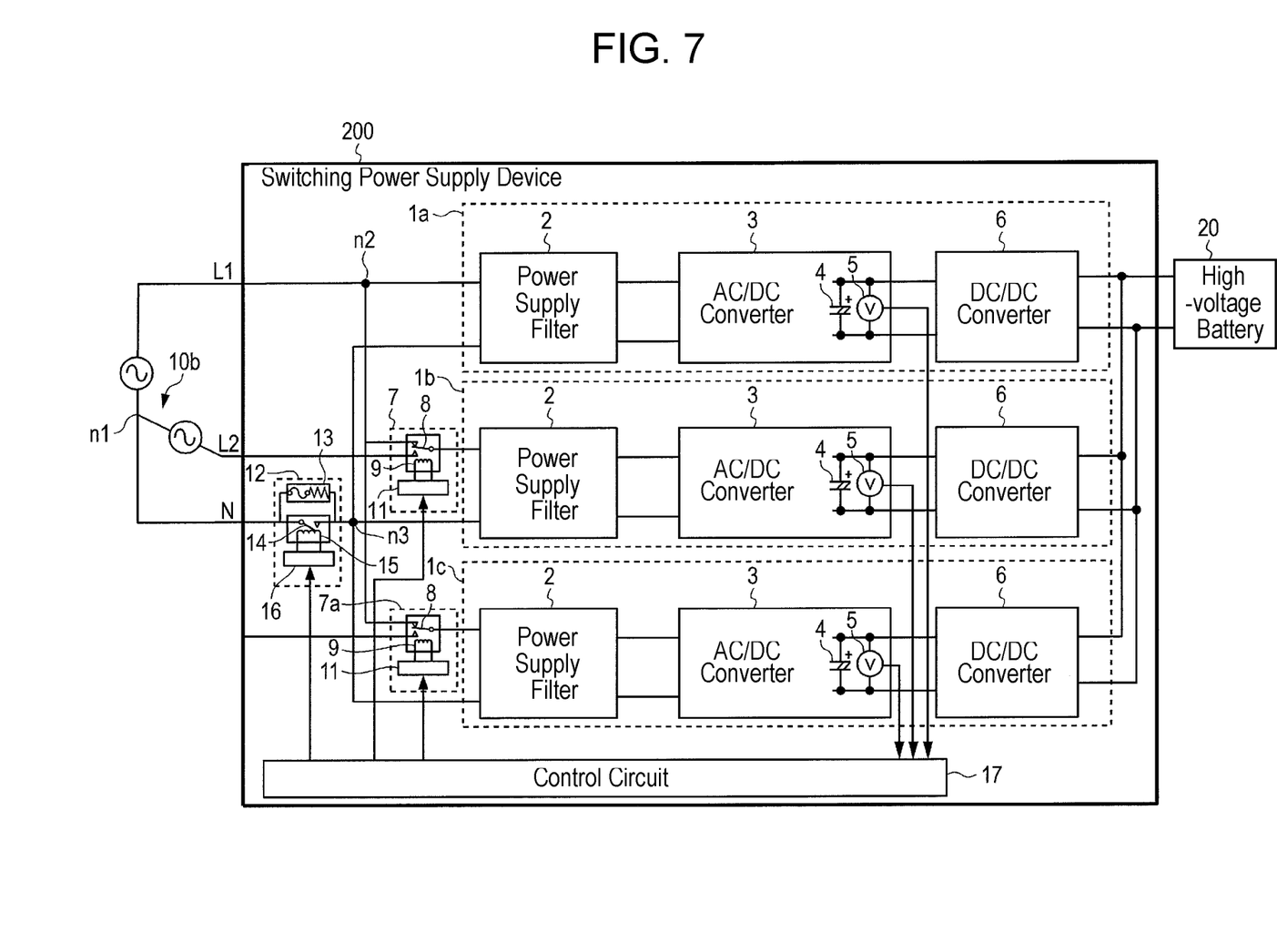
FIG. 7 is a circuit diagram illustrating a case where the switching power supply device according to the second exemplary embodiment of the present disclosure is connected to a two-phase AC power supply.

Moreover, when the specification of the AC power supply is two-phase AC power supply 10b, control circuit 17 performs control such that initial charge of electrolyte capacitor 4 of AC/DC converter 3 in each of power supply circuit 1a and power supply circuit 1b is performed. At this time, switching relay 8 of switching circuit 7, switching relay 8 of switching circuit 7a, and inrush prevention relay 14 are off as illustrated in FIG. 7.

Since switching relay 8 of switching circuit 7 and inrush prevention relay 14 are off at this time, power supplied from two-phase AC power supply 10b is supplied to power supply circuit 1a and power supply circuit 1b via power supply line L1, and is also supplied to the inrush current limiting resistor of inrush current limiting circuit 13. This allows charging (initial charge) of electrolyte capacitor 4 of each of power supply circuit 1a and power supply circuit 1b to be performed while preventing inrush current from flowing to power supply circuit 1a and power supply circuit 1b.

Moreover, when the specification of the AC power supply is three-phase AC power supply 10c, control circuit 17 performs control such that initial charge of electrolyte capacitor 4 of AC/DC converter 3 in each of power supply circuit 1a, power supply circuit 1b, and power supply circuit 1c is performed.

Figure 9:
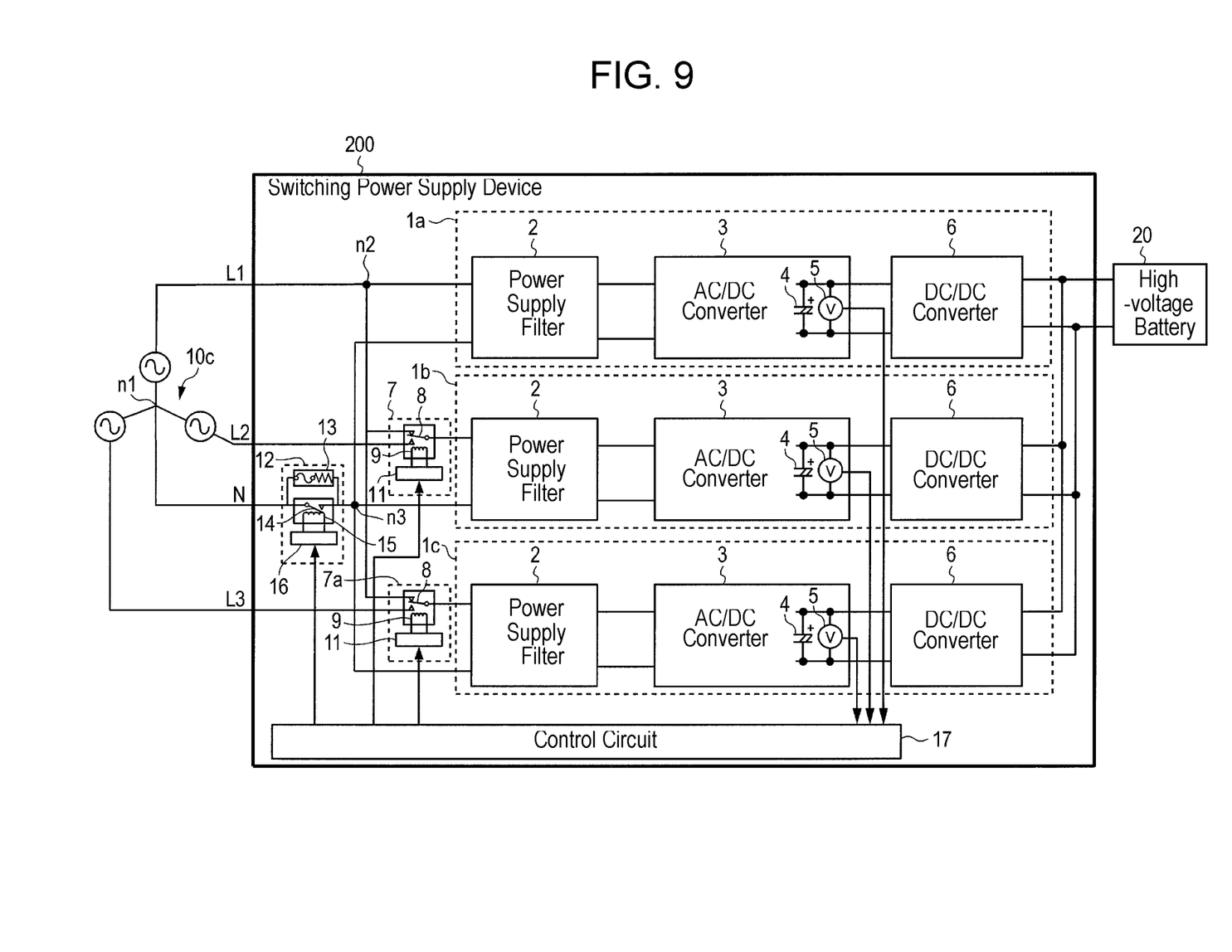
FIG. 9 is a circuit diagram illustrating a case where the switching power supply device according to the second exemplary embodiment of the present disclosure is connected to a three-phase AC power supply.

At this time, switching relay 8 of switching circuit 7, switching relay 8 of switching circuit 7a, and inrush prevention relay 14 are off as illustrated in FIG. 9.

Since switching relay 8 of switching circuit 7, switching relay 8 of switching circuit 7a, and inrush prevention relay 14 are off at this time, power supplied from three-phase AC power supply 10c is supplied to power supply circuit 1a, power supply circuit 1b, and power supply circuit 1c via power supply line L1, and is also supplied to the inrush current limiting resistor of inrush current limiting circuit 13. In other words, the circuit configuration is such that power supply circuit 1a, power supply circuit 1b, power supply circuit 1c and inrush current limiting circuit 13 are connected to neutral point n1 and the first phase (L1) of three-phase AC power supply 10c therebetween. Accordingly, the inrush current limiting resistor of inrush current limiting circuit 13 allows charging (initial charge) of electrolyte capacitor 4 of each of power supply circuit 1a, power supply circuit 1b, and power supply circuit 1c to be performed, while preventing inrush current from flowing to power supply circuit 1a, power supply circuit 1b, and power supply circuit 1c.

After the above control, control circuit 17 receives the voltage value of each of electrolytic capacitor 4 measured by respective one of voltmeters 5.

The operation of step S102 is similar to that in the first exemplary embodiment above, and thus, description of the operation of step S102 is omitted here.

When the specification of the AC power supply determined in step S100 is single-phase AC power supply 10a (step S103: single phase), control circuit 17 turns on inrush prevention relay 14 (step S105). At this time, both switching relay 8 of switching circuit 7 and switching relay 8 of switching circuit 7a are controlled to remain off. Then, only power supply circuit 1a is driven so that high-voltage battery 20 is charged (first mode).

Figure 8:
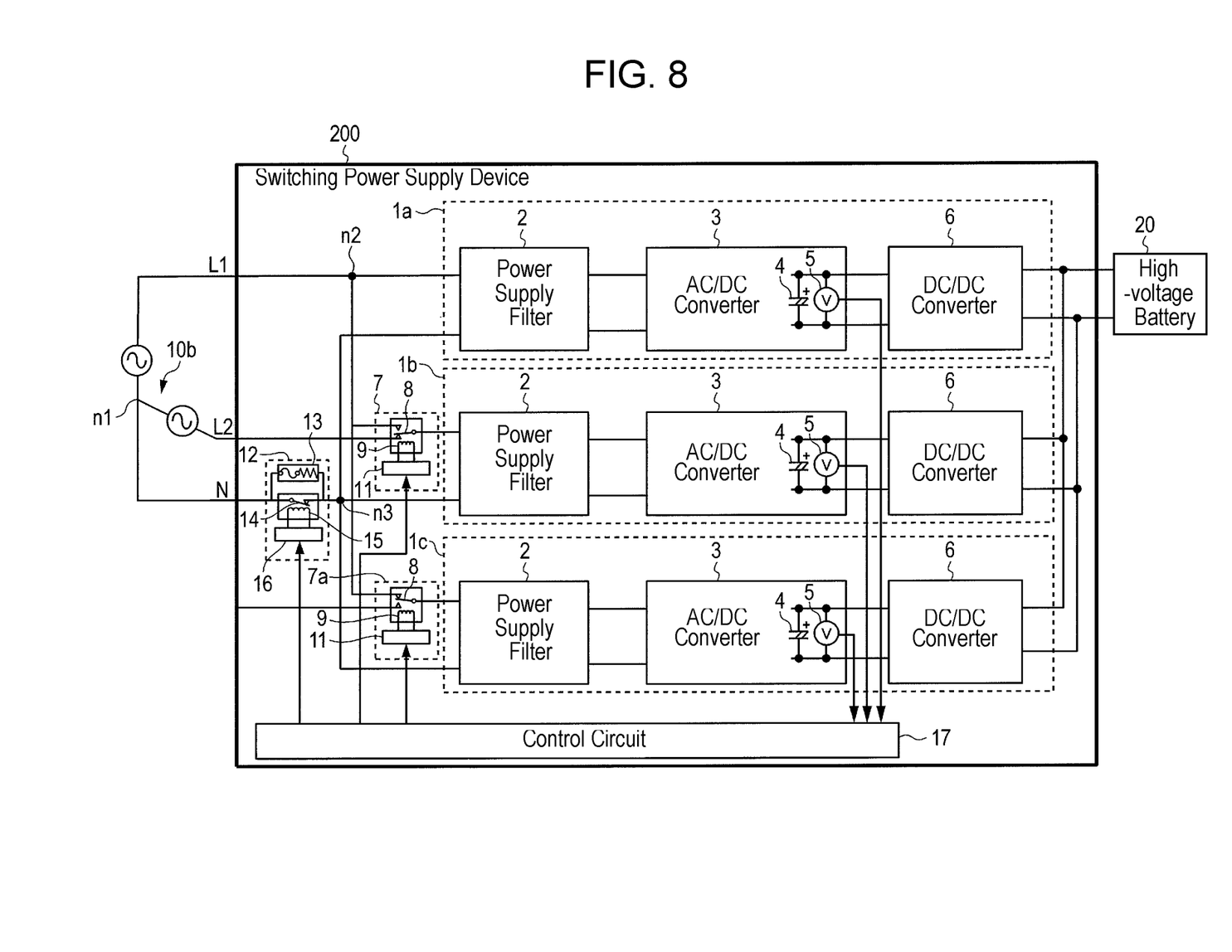
FIG. 8 is a circuit diagram illustrating a case where the switching power supply device according to the second exemplary embodiment of the present disclosure is connected to the two-phase AC power supply.

When the specification of the AC power supply determined in step S100 is two-phase AC power supply 10b (step S103: multiphase), control circuit 17 turns on switching relay 8 of switching circuit 7 (step S104) and turns on inrush prevention relay 14 (step S105), as illustrated in FIG. 8. As illustrated in FIG. 8, switching relay 8 of switching circuit 7a is controlled to remain off. Accordingly, both power supply circuits 1a and 1b are driven so that high-voltage battery 20 is charged (second mode).

When the specification of the AC power supply determined in step S100 is three-phase AC power supply 10c (step S103: multiphase), control circuit 17 turns on both switching relay 8 of switching circuit 7 and switching relay 8 of switching circuit 7a, as illustrated in FIG. 10 (step S104). Accordingly, the circuit configuration is such that power supply circuit 1a, power supply circuit 1b, and power supply circuit 1c correspond to respective phases. In other words, the circuit configuration is such that power supply circuit 1a is connected to neutral point n1 and the first phase (L1) of three-phase AC power supply 10c therebetween, power supply circuit 1b is connected to neutral point n1 and the second phase (L2) of three-phase AC power supply 10c therebetween, and power supply circuit 1c is connected to neutral point n1 and the third phase (L3) of three-phase AC power supply 10c therebetween.

Then, control circuit 17 turns on inrush prevention relay 14 (step S105). Accordingly, all of power supply circuits 1a, 1b, and 1c are driven so that high-voltage battery 20 is charged (third mode).

An example of the operation of switching power supply device 200 has been described above.

Figure 11:
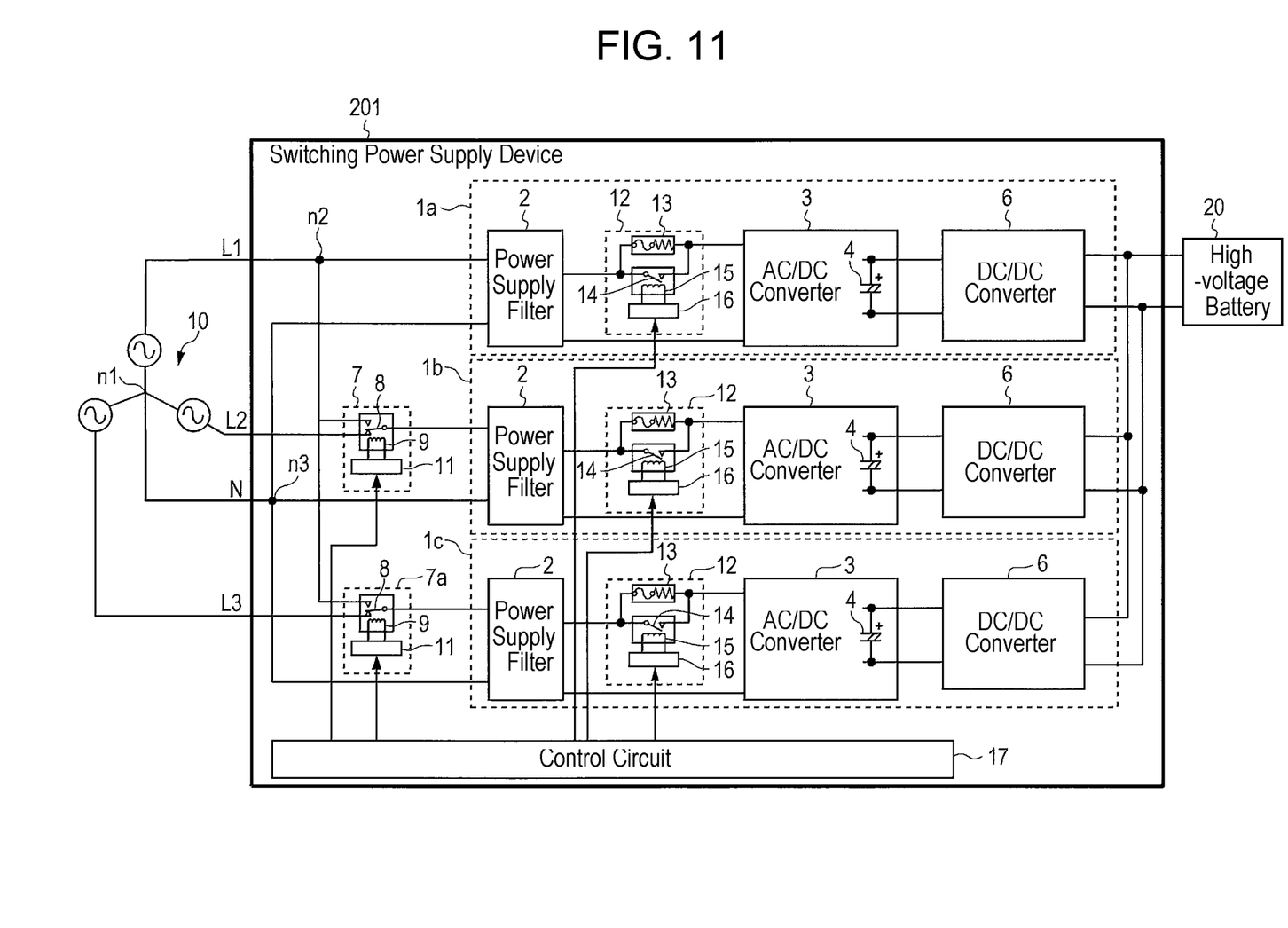
FIG. 11 is a circuit diagram illustrating a configuration example of a switching power supply device according to a comparative example described in the second exemplary embodiment of the present disclosure.

FIG. 11 illustrates a configuration example of switching power supply device 201 as an example compared to the second exemplary embodiment. Note that in FIG. 11, the structural elements which are the same as in FIG. 6 to FIG. 10 are illustrated with the same reference numerals, and description of such structural elements is omitted.

As illustrated in FIG. 11, in switching power supply device 201, inrush current prevention circuits 12 are disposed in power supply circuit 1a, power supply circuit 1b, and power supply circuit 1c, respectively. In such a configuration, a plurality of inrush current prevention circuits 12 are required, which causes problems of increased cost and size of switching power supply device 201.

In contrast, in switching power supply device 200 according to the present embodiment, one inrush current prevention circuit 12 is disposed downstream of meeting point n3. In all of the cases where the AC power supply is single-phase AC power supply 10a, where the AC power supply is two-phase AC power supply 10b, and where the AC power supply is three-phase AC power supply 10c, inrush current prevention circuit 12 is used. Accordingly, it is possible to reduce the cost and size of switching power supply device 200.

Although embodiments of the present disclosure have been described above, the present disclosure is not limited to those embodiments. Various modifications are possible within the scope of the essence of the present disclosure.

For example, in the above embodiments, the example has been described where power supply circuit 1a, power supply circuit 1b, and power supply circuit 1c are connected to L1 (first phase) when initial charge of the capacitors is performed. However, the present disclosure is not limited to such an example. It may be that power supply circuit 1a, power supply circuit 1b, and power supply circuit 1c are connected to L2 (second phase) or L3 (third phase) when initial charge of the capacitors is performed. In other words, when initial charge of the capacitors is performed, it is only required that a plurality of power supply circuits (1a to 1c) are connected between a given phase and neutral point n1.

INDUSTRIAL APPLICABILITY

The present disclosure can be applied to a power supply device which converts AC power from an AC power supply into DC power.

REFERENCE MARKS IN THE DRAWINGS 1a, 1b, 1c power supply circuit
2 power supply filter
3 AC/DC converter
4 electrolyte capacitor
5 voltmeter
6 DC/DC converter
7, 7a switching circuit
8 switching relay
9, 15 coil
10a single-phase AC power supply
10b two-phase AC power supply
10c three-phase AC power supply
11, 16 drive circuit
12 inrush current prevention circuit
13 inrush current limiting circuit
14 inrush prevention relay
17 control circuit
20 high-voltage battery
100, 101, 200, 201 switching power supply device

The invention claimed is:

1. A switching power supply device comprising:
a plurality of power supply circuits including a first power supply circuit and a second power supply circuit, the first power supply circuit corresponding to a first phase of a plurality of phases of a multiphase alternating-current (AC) power supply, the second power supply circuit corresponding to a second phase of the plurality of phases, the first power supply circuit including a first capacitor, the second power supply circuit including a second capacitor;
a first switching circuit, which, in operation, switches a phase of the plurality of phases to be coupled to the second power supply circuit between the first phase and the second phase; and
an inrush current prevention circuit, which, in operation, prevents inrush current, the inrush current prevention circuit being disposed on a negative power supply line of the multiphase AC power supply at a position that is closer to the multiphase AC power supply than a connection point coupling the first power supply circuit and the second power supply circuit to each other, the inrush current prevention circuit including an inrush current limiting resistor and an inrush prevention relay which is connected in parallel with the inrush current limiting resistor; and
a control circuit, which, in operation, controls the first switching circuit and the inrush current prevention circuit,
wherein the control circuit, in operation, controls the first switching circuit to set the phase of the plurality of phases to be coupled to the second power supply circuit to the first phase, and the inrush current prevention circuit to turn off the inrush prevention relay such that an initial charge of the first capacitor and the second capacitor is performed.

2. The switching power supply device according to claim 1 wherein, in response to the initial charge of the first capacitor and second capacitor being completed, the control circuit controls the first switching circuit to switch the phase of the plurality of phases to be connected to the second power supply circuit from the first phase to the second phase, and controls the inrush current prevention circuit to turn off.

3. The switching power supply device according to claim 2 wherein
the first power supply circuit includes an AC/DC converter configured to convert an AC signal into a direct-current (DC) signal, and a DC/DC converter configured to transform the DC signal,
the AC/DC converter includes the first capacitor and a voltmeter configured to measures a voltage of the first capacitor, and
the control circuit determines, based on a voltage value from the voltmeter, whether or not the initial charge of the first capacitor is completed.

4. The switching power supply device according to claim 3 wherein
in a case where a single-phase AC power supply is applied to the switching power supply device, the control circuit controls the first switching circuit and the inrush current prevention circuit when the initial charge is performed, such that power supplied from the single-phase AC power supply is supplied to the first power supply circuit via the first phase and is also supplied to the inrush current limiting resistor, and the control circuit controls the first switching circuit and the inrush current prevention circuit after the initial charge is completed, such that power supplied from the single-phase AC power supply is supplied to the first power supply circuit via the first phase and is not supplied to the inrush current limiting resistor, and in a case where a two-phase AC power supply is applied to the switching power supply device, the control circuit controls the first switching circuit and the inrush current prevention circuit when the initial charge is performed, such that power supplied from the two-phase AC power supply is supplied to the first power supply circuit and the second power supply circuit via the first phase and is also supplied to the inrush current limiting resistor, and the control circuit controls the first switching circuit and the inrush current prevention circuit after the initial charge is completed, such that power supplied from the two-phase AC power supply is supplied to the first power supply circuit via the first phase and to the second power supply circuit via the second phase, and is not supplied to the inrush current limiting resistor.

5. The switching power supply device according to claim 3 wherein the plurality of power supply circuits further includes a third power supply circuit, the third power supply circuit corresponds to a third phase of the plurality of phases, in a case where a single-phase AC power supply is applied to the switching power supply device, the control circuit controls the first switching circuit and the inrush current prevention circuit when the initial charge is performed, such that power supplied from the single-phase AC power supply is supplied to the first power supply circuit via the first phase and is also supplied to the inrush current limiting resistor, and the control circuit controls the first switching circuit and the inrush current prevention circuit after the initial charge is completed, such that power supplied from the single-phase AC power supply is supplied to the first power supply circuit via the first phase and is not supplied to the inrush current limiting resistor, and in a case where a two-phase AC power supply is applied to the switching power supply device, the control circuit controls the first switching circuit and the inrush current prevention circuit when the initial charge is performed, such that power supplied from the two-phase AC power supply is supplied to the first power supply circuit and the second power supply circuit via the first phase and is also supplied to the inrush current limiting resistor, and the control circuit controls the first switching circuit and the inrush current prevention circuit after the initial charge is completed, such that power supplied from the two-phase AC power supply is supplied to the first power supply circuit via the first phase and to the second power supply circuit via the second phase and is not supplied to the inrush current limiting resistor, and in a case where a three-phase AC power supply is applied to the switching power supply device, the control circuit controls the first switching circuit and the inrush current prevention circuit when the initial charge is performed, such that power supplied from the three-phase AC power supply is supplied to the first power supply circuit, the second power supply circuit, and the third power supply circuit via the first phase and is also supplied to the inrush current limiting resistor, and the control circuit controls the first switching circuit and the inrush current prevention circuit after the initial charge is completed, such that power supplied from the three-phase AC power supply is supplied to the first power supply circuit via the first phase, to the second power supply circuit via the second phase, and to the third power supply circuit via the third phase and is not supplied to the inrush current limiting resistor.

6. The switching power supply device according to claim 1 wherein the first capacitor and the second capacitor receive the first phase in the initial charge.

7. The switching power supply device according to claim 1 wherein the first switching circuit is configured to receive the first phase and the second phase, and the inrush current prevention circuit is configured to receive the first phase.

8. The switching power supply device according to claim 1 wherein an output of the inrush current prevention circuit is coupled to the first power supply circuit and the second power supply circuit.

* * * * *